No. 852,006. PATENTED APR. 30, 1907.
E. WIGGLESWORTH.
FLEXIBLE WHEEL.
APPLICATION FILED NOV. 16, 1906.

2 SHEETS—SHEET 1.

Witnesses:—
William Sadler
Annie Park

Inventor
Ernest Wigglesworth
by H. Fairburn Hart
Attorney

No. 852,006. PATENTED APR. 30, 1907.
E. WIGGLESWORTH.
FLEXIBLE WHEEL.
APPLICATION FILED NOV. 16, 1906.
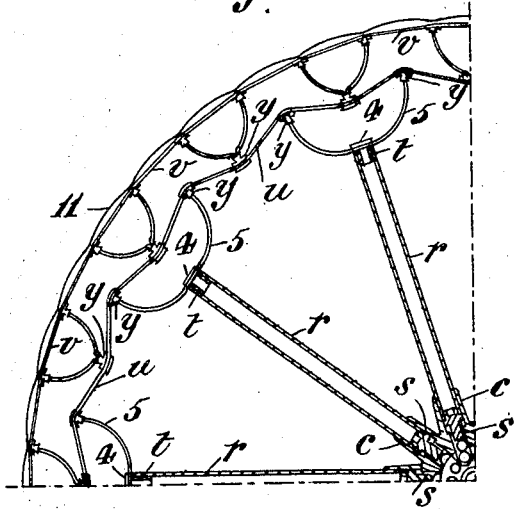

UNITED STATES PATENT OFFICE.

ERNEST WIGGLESWORTH, OF LEEDS, ENGLAND.

FLEXIBLE WHEEL.

No. 852,006.  Specification of Letters Patent.  Patented April 30, 1907.

Application filed November 16, 1906. Serial No. 343,754.

*To all whom it may concern:*

Be it known that I, ERNEST WIGGLESWORTH, a subject of the King of Great Britain and Ireland, residing at 11 Salisbury avenue, Armley, Leeds, in the county of York, England, have invented new and useful Improvements in Flexible Wheels, of which the following is a specification.

This invention has reference to improvements in flexible wheels such as are used for automobiles, bicycles, and other road vehicles.

The object of the invention is to construct a flexible wheel in which its main parts are loosely yet securely attached together. The said wheel is composed of a number of concentric rims,—formed of a flexible fibrous material,—arranged one within the other at suitable distances apart to permit of V or Y shaped plates being inserted in sockets between the rims. Means are also provided for the tensioning of the rims by means of the spokes mounted in the hub of the wheel so that the spokes are capable of separate or simultaneous adjustment.

A flexible wheel constructed according to this invention is illustrated in the accompanying drawings, in which:—

Figure 1:
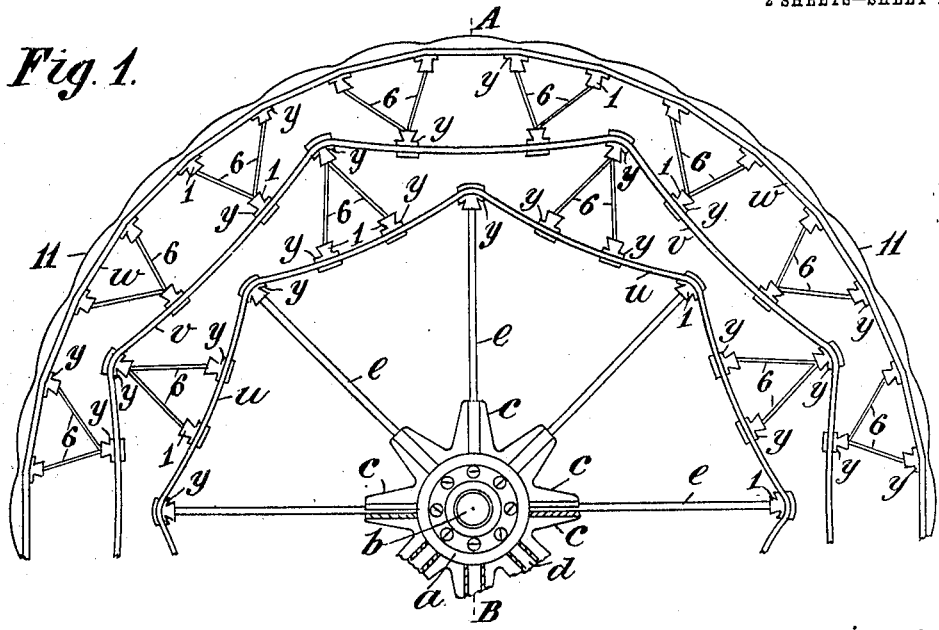
Figure 4:
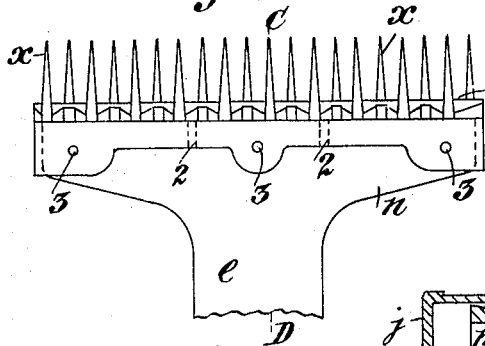
Figure 6:
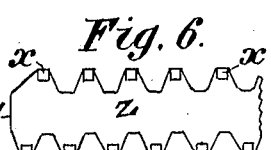
Figure 3:
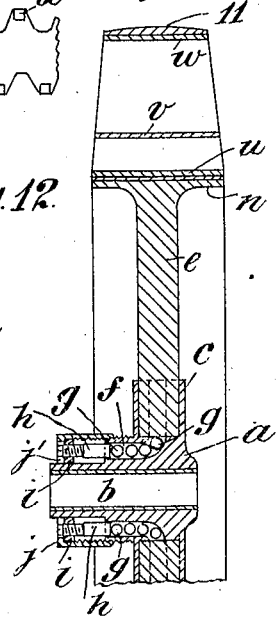
Figure 5:
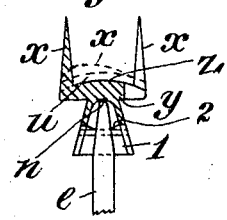
Figure 12:
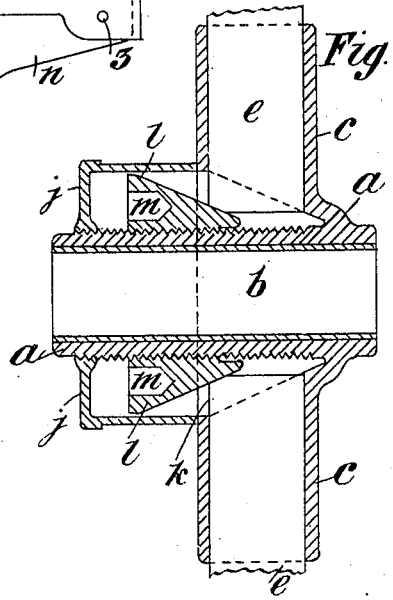

Figure 1. is a front elevation of one half of a wheel provided with three concentric flexible rims. Fig. 2. a front elevation of a quarter of a wheel having two concentric rims. The following views are drawn to a larger scale than Figs. 1 and 2. Fig. 3. a sectional elevation on line A. B. Fig. 1. Fig. 4. a side elevation of the outer portion of a spoke and of a socket for receiving the same. Fig. 5. a section of the socket on line C. D. Fig. 4. Fig. 6. a plan of socket looking at the top. Fig. 7. an end elevation of a socket with two rows of attaching spikes. Fig. 8. an end elevation of a socket with four rows of spikes. Fig. 9. an end elevation of a socket with two rows of spikes, and the socket portion arranged at an angle. Fig. 10. a front elevation of a spoke. Fig. 11. an end elevation of the same. Fig. 12. a sectional elevation with a cone adjustment for the spokes. Fig. 13. a plan of the same. Fig. 14. an edge view of the V or Y shaped supporting plates which are inserted between the rims of the wheels. Fig. 15. a side view of the same. Fig. 16. an edge view of curved plates.

$a$ is the boss of the hub of the wheel and in it is formed a central hole $b$ for the axle. Around the boss are a number of sockets $c$. Each socket is provided with a rectangular hole $d$ for the reception of the spoke $e$. The center of the rectangular hole is enlarged at $f$ as shown at Fig. 13, and the enlargement is continued through the boss $a$, as at Fig. 3. A separate hole $f$ is provided for each spoke. In each hole $f$ are inserted a number of balls $g$ which are made to press against the end of each spoke by a stud $h$. The outer end of each stud is screwed into a disk $i$ which slides upon a reduced portion of the boss $a$. The boss $a$ is provided with a cap $j$ which screws onto its periphery, and is made to press against the disk $i$ for simultaneously adjusting the studs $h$. A hole $j'$ is made in the cap for the reception of the outer ends of the studs $h$ in order that they may be capable of separate adjustment.

In some cases, as at Fig. 12, the holes $f$, balls $g$, studs $h$, and disk $i$ are dispensed with. When this is the case a conical shaped recess $k$ is cast or formed in one side of the hub around the boss $a$. The recess $k$ extends beyond the width of the spoke and length of rectangular hole $d$. The boss $a$ has a screw thread cut in its periphery. A cone $l$,—having holes $m$ formed in its outer end for intermittently rotating it,—is screwed upon the boss $a$. The inclined surface of the cone is made to press against the inner end of each spoke,—which in this case may be slightly inclined,—for causing it to move outward. The cone $l$ is inclosed in the cap $j$ which is also screwed upon the boss $a$.

Each spoke $e$ is enlarged at its outer end $n$ (Fig. 10) and also slightly tapered and semispherical as at Fig. 11. In the end $n$ are formed or cut a number of recesses $o$ for the purpose to be presently explained. A number of holes $p$ are also formed in the said end. The inner end of each spoke is provided with a presser piece $q$ (Figs. 10 and 11) against which the balls $f$ or cone $l$ work. Or, when the spoke is made in tubular form, as $r$, Fig. 2, then the spoke is provided with the end pieces $s$ and $t$ which fit respectively into the sockets $c$ and into the outer ends of the spokes. To the outer end of each tubular spoke $r$ is fixed, by a set screw $4$, the bifurcated or bow-shaped piece 5 the outer ends of which are shaped, as shown at Fig. 2, to fit into the sockets $y$.

$u$, $v$, and $w$ are flexible fibrous bands, which at Fig. 1. are shown arranged concentrically within each other, but at suitable distances,—but not necessarily equi-distant,—apart. The flexible bands are made of lengths or strips of five to seven or eight ply of belting, such as is used for driving machinery, and it is composed of, say, balata, or canvas and rubber, or cotton woven belting, or webbing, or of the material commercially known as "Gandy belt." The said bands may be woven or made in endless pieces, or their ends may be joined together by any suitable means. The bands are made of such a width as will permit of the material being folded over one or more times with or without a layer of rubber or gutta-percha or solution between each fold. Through the folds of each band are passed the teeth $x$ projecting from the top of each socket $y$. The teeth $x$ are arranged in two or more rows as shown at Figs. 5 to 9. The teeth in one row are arranged to be opposite the spaces in the opposite row, as shown at Fig. 6. so that the teeth after passing through a band may be turned or bent over on to one of the faces as shown in dotted lines at Fig. 5, and bent down so as to clip the band and socket together. The upper surface $z$ of each main portion of the socket is curved transversely in order that the band may more readily bed itself in position. The main portion of the socket is made of the same width as, or slightly larger than the breadth of the band; and on its undersurface is provided a projecting trough 1 with sides to taper outward and provided with end pieces. The sides of the trough are shaped as shown at Fig. 4. The ends $n$ of the spokes $e$ are made to fit between the trough ends, and in order to reduce the lateral strain on such ends as well as to aid in keeping the bands in a working position, a number of transverse and pendent projections 2 are formed in the trough at suitable distances apart. The projections 2 are adapted to fit into the recesses $o$ in the upper end of each spoke. A pin or set screw is passed through holes 3 in the sides of the trough and holes $p$ in the enlarged ends of the spokes for retaining the said parts in position. In some cases the troughs 1 may project at or about a right angle from the main portion of the sockets, as at Figs. 5, 7, and 8, and in the other cases at an angle thereto, as at Fig. 9. The bottom of the trough is curved in order to provide for a slight oscillating movement of the spokes in the direction of the path of rotation. A socket $y$ is placed on the outer end of each spoke.

Between each two adjacent spokes $e$ (Fig. 1) two sockets $y$ are fixed on the opposite side of band $u$ with their troughs 1 projecting in an outward direction to receive the end of the supporting plates 6 which are made of steel or other suitable material bent or attached together so as to form a more or less V or Y shape as shown at Fig. 14; or in the curved form shown at Fig. 16. In the drawings the supporting plates 6 are formed of two portions riveted together at one end, and with their free end splayed out. The plates are shaped, as shown at Fig. 15, and provided with recesses 7 in their upper and lower edges for engaging with the projections 2 in the troughs 1.

The ends 9 and 10 are placed respectively in the sockets $y$ fixed to the band $u$ with their troughs projecting in an outward direction, while the ends 8 are inserted in inward projecting troughs of sockets $y$ fixed to a second band $v$ which is outside of the band $u$. Between each two adjacent sockets $y$ $y$ fixed to the band $v$ with inwardly projecting troughs are fixed on the opposite side of the band two sockets with their troughs projecting in an outward direction for receiving a second set of supporting plates 6. In this case ends 8 fit into the last named sockets, while the splayed out ends 9 and 10 are arranged to enter the inwardly projecting troughs of sockets fixed to a third band $w$ which is on the outside of the second band $v$. But when two bands $u$ and $v$ only are used as at Fig. 2, then only one socket $y$ is used between the bifurcated or bow-shaped ends of adjacent spokes, and also in the spaces between adjacent spokes. In this case the supporting plates 6 shown at Fig. 16 will be found more suitable than those shown at Fig. 15.

The sockets $y$ shown at Fig. 9. will be found suitable for the outer bands, while those shown at Figs. 5, 7, and 8 may be preferable for the inner bands.
It will readily be seen in both the arrangements the same method of suspension is employed, namely, to arrange the supporting plates in the space between two points where an inner band is attached to its supporting sockets. By this means the required resiliency of the wheel is obtained.

11 is a rubber tire which is fixed to the outer band.

The spokes $e$ or $r$ having been inserted in the sockets $c$ and the balls $g$ in the hole $f$,—or the cone $l$ screwed into position on the boss $a$,—the pins $h$ are inserted in the holes $f$ and pressed therein by the cap $j$ acting upon the disk $i$. The sockets $y$ having been attached to the bands $u$, $v$, $w$, the troughs of the sockets attached to the band $u$ are placed upon the outer ends of the spokes $e$, or upon the ends of the bifurcated pieces 5 attached to the tubular spokes $r$.
The band $v$ with its sockets attached thereto is then placed around and on the outside of the band $u$ and the supporting pieces 6 are placed with their ends 8 in troughs of the sockets $y$ attached to the inner surface of the band $v$ and with their ends 9, 10 in the troughs of the sockets fixed to the outer surface of the band $u$. The band $w$ is then in like manner placed around and on the outside of the band $v$, but in this case the supporting pieces 6 are reversed so that the ends 8 are outermost.

When the bands and supporting pieces have been placed in position the wheel is ready for centering with the axis of the hub $a$. This may be accomplished by adjusting the screws $h$, or when a cone $l$ is used by fitting the inner ends of the spokes to its inclined surface. The centering of the spokes and bands being achieved, the required tension is imparted to the bands by screwing the cap $j$,—or cone $l$,—on to the boss $a$ and thereby pressing the disk $i$ and screws $h$ simultaneously inward, thereby forcing the spokes outward, and tightening the tension of the band $u$. The tightening of the band $u$ causes the supporting pieces 6 between bands $u$ and $v$ to be moved for tightening the band $v$. The band $v$ in like manner acts upon the supporting pieces 6 between bands $v$, $w$, to be moved, thereby tightening the band $w$.

In this manner a flexible and resilient wheel may be formed with a number of concentric fibrous rims arranged one within the other.

I claim:—

1. In a flexible wheel, the combination with a hub provided with a number of adjustable spokes, of a number of concentric flexible fibrous rims, one of which bands is supported by the outer ends of the spokes, each of the other bands being supported and loosely attached to each other.

2. In a flexible wheel, the combination of a hub provided with sockets for the reception of the spokes, means for regulating the position of each spoke separately and simultaneously, spokes having enlarged ends adapted to engage with projecting troughs fixed to flexible fibrous bands, and a number of concentric flexible fibrous bands retained at the proper distance apart by plates, said plates being arranged in pairs, as set forth.

3. In a flexible wheel, the combination of the spokes having enlarged ends, with a hub having a central boss with a number of sockets arranged around it and radiating to its center, each socket having a hole varying in size for the reception of the spokes, and for a number of balls adapted to press against the inner end of each spoke, a pin to pass in the end of the said hole at the face of the boss, each of said pins being screwed into a disk sliding upon the boss, and a cap screwed upon the boss and adapted to press the pins simultaneously inward for adjusting the said spokes to their work.

4. In a flexible wheel, the combination of a hub having sockets for the reception of the spokes, spokes fitting into holes in said sockets and having enlarged ends, means for adjusting the position of the spokes in the sockets, a number of concentric flexible fibrous bands arranged around the spokes, sockets fixed to said bands, and plates for retaining the bands at the required distances apart, said plates being adapted to engage with the sockets and to slightly oscillate therein.

5. In a flexible wheel, the combination of a number of flexible fibrous bands adapted to be arranged concentrically around the spokes of the wheel, sockets fixed to each flexible band, each socket composed of a main portion and having pins projecting in rows from its surface for attaching it to the flexible band, and a trough from its undersurface, plates for retaining the flexible bands apart, said plates being arranged in pairs so that two of their edges are in contact with one another, and the ends of the plates when inserted in the troughs of the sockets are prevented from moving laterally but are free to oscillate therein.

6. In a flexible wheel, the combination with a hub provided with a number of adjustable spokes, of a plurality of concentric flexible bands, one of which is supported by the spokes, and supporting connections between said bands.

7. In a flexible wheel, the combination of a hub provided with sockets for the reception of spokes, means for regulating the position of the spokes, spokes engaged with sockets fixed to flexible bands, a plurality of flexible bands, and means for retaining said bands a proper distance apart.

8. In a flexible wheel, the combination of a hub having sockets for the reception of spokes, spokes fitting into holes in said sockets, means for adjusting the position of spokes in the sockets, a plurality of concentric flexible bands arranged around the spokes, sockets fixed to said bands, and means engaging said sockets and adapted to oscillate therein for retaining the bands at the required distance apart.

9. In a flexible wheel, the combination of a plurality of flexible bands adapted to be arranged concentrically around the spokes of the wheel, sockets fixed to each flexible band, each socket composed of a main portion and having pins projecting in rows from its surface for attaching it to the flexible band, a trough, and plates arranged in pairs connected together at one edge and adapted to engage the troughs of said sockets.

ERNEST WIGGLESWORTH.

Witnesses:
WILLIAM SADLER,
FRITZ KRAMER.